US011166328B2

United States Patent
Tabet et al.

(10) Patent No.: US 11,166,328 B2
(45) Date of Patent: Nov. 2, 2021

(54) CONTROL AND SHARED CHANNELS IN DEVICE-TO-DEVICE COMMUNICATION

(71) Applicant: Apple Inc., Cupertino, CA (US)

(72) Inventors: Tarik Tabet, Los Gatos, CA (US); Lydi Smaini, San Jose, CA (US); Ronald W. Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 16/106,068

(22) Filed: Aug. 21, 2018

(65) Prior Publication Data

US 2019/0090292 A1    Mar. 21, 2019

Related U.S. Application Data

(60) Provisional application No. 62/560,509, filed on Sep. 19, 2017.

(51) Int. Cl.
*H04W 76/14* (2018.01)
*H04W 56/00* (2009.01)
(Continued)

(52) U.S. Cl.
CPC .......... *H04W 76/14* (2018.02); *H04W 8/005* (2013.01); *H04W 56/001* (2013.01);
(Continued)

(58) Field of Classification Search
CPC ... H04W 72/02; H04W 74/002; H04W 8/005; H04W 88/04; H04W 28/0278; H04W 92/18; H04W 36/36; H04W 52/383
See application file for complete search history.

(56) References Cited

U.S. PATENT DOCUMENTS 9,642,090 B2    5/2017  Morita
2016/0044653 A1*  2/2016  Bagheri ............... H04W 76/00
                                            370/329
(Continued)

FOREIGN PATENT DOCUMENTS

CN    103582069 A    2/2014
CN    105992364 A    10/2016
(Continued)

OTHER PUBLICATIONS

Office Action for Chinese Patent Application No. 201810998384.9; dated Apr. 16, 2021; 8 pages.
(Continued)

*Primary Examiner* — Romani Ohri
(74) *Attorney, Agent, or Firm* — Kowert, Hood, Munyon, Rankin & Goetzel, P.C.

(57) ABSTRACT

This disclosure relates to techniques for supporting narrowband device-to-device wireless communication, including possible techniques for performing control and data communications between wireless devices that have performed discovery. A first device may transmit first control information to a second wireless device. The first control information may indicate a buffer status of the first wireless device. The first device may receive second control information from the second wireless device. The second control information may include an acknowledgement indication for the first control information. The first device may transmit a data communication to the second wireless device based at least in part on the first control information and the second control information.

20 Claims, 7 Drawing Sheets

(51) Int. Cl.
*H04W 74/00* (2009.01)
*H04W 8/00* (2009.01)
*H04W 72/12* (2009.01)
*H04W 72/02* (2009.01)
*H04W 92/18* (2009.01)

(52) U.S. Cl.
CPC ....... *H04W 72/02* (2013.01); *H04W 72/1284* (2013.01); *H04W 74/002* (2013.01); *H04W 92/18* (2013.01)

(56) References Cited

U.S. PATENT DOCUMENTS

| | | | |
|---|---|---|---|
| 2016/0183241 A1* | 6/2016 | Lee | H04W 56/0015 455/425 |
| 2016/0323870 A1* | 11/2016 | Wei | H04W 72/048 |
| 2017/0006583 A1 | 1/2017 | Tavildar | |
| 2017/0048822 A1 | 2/2017 | Lee | |
| 2017/0223757 A1 | 8/2017 | Tsuboi | |
| 2017/0310427 A1* | 10/2017 | Wakabayashi | H04L 5/001 |
| 2017/0353819 A1* | 12/2017 | Yin | H04L 47/30 |
| 2018/0020470 A1* | 1/2018 | Zhuang | H04W 72/1278 |
| 2018/0054804 A1* | 2/2018 | Luo | H04W 72/04 |
| 2018/0077624 A1* | 3/2018 | Jung | H04W 52/0225 |
| 2018/0206260 A1* | 7/2018 | Khoryaev | H04W 72/1289 |
| 2018/0287866 A1* | 10/2018 | Yoon | H04B 17/24 |
| 2019/0075543 A1* | 3/2019 | Kim | G01S 5/0236 |
| 2020/0029353 A1* | 1/2020 | Xu | H04W 72/1284 |

FOREIGN PATENT DOCUMENTS

| | | |
|---|---|---|
| CN | 107005535 A | 8/2017 |
| WO | 2016078905 A1 | 5/2016 |

OTHER PUBLICATIONS

Intel Corporation "Resource Allocation for Mode-1 D2D Operation"; 3GPP TSG RAN WG1 Meeting #78 R1-142872; Dresden, Germany; Aug. 18-24, 2014; 7 pages.

* cited by examiner

CONTROL AND SHARED CHANNELS IN DEVICE-TO-DEVICE COMMUNICATION

PRIORITY INFORMATION

This application claims priority to U.S. provisional patent application Ser. No. 62/560,509, entitled "Control and Shared Channels in Device-to-Device Communication," filed Sep. 19, 2017, which is hereby incorporated by reference in its entirety as though fully and completely set forth herein.

TECHNICAL FIELD

The present application relates to wireless communication, including to techniques for performing narrowband device-to-device wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One area of rapid change is the field of device-to-device (D2D) wireless communication.

SUMMARY

Embodiments are presented herein of, inter alia, systems, apparatuses, and methods for performing device-to-device wireless communication, including techniques for providing control and shared channels for device-to-device wireless communication.

The techniques described herein may help facilitate data communication scheduling and exchange of control information needed to establish a peer-to-peer link in the absence of any centralized network scheduler.

According to the techniques described herein, a pair of peer devices may be able to synchronize to a device-to-device group and perform discovery with each other to establish initial resources for control and data communications between the peer devices. Using these initial resources, the peer devices may perform control communications (e.g., to set up subsequent data communications) and data communications.

The control communications may be performed according to a framework in which control signaling acknowledgements are used, at least for some types of control communications. In other words, when a device transmits control information (e.g., including buffer status information and/or various other information to initiate/schedule a data communication) to a peer device, the peer device may respond with an acknowledgment of the control information. In some instances, different control channels (e.g., having different formats/structures/physical layer transmission characteristics/etc.) may be used by the different peer devices. For example, there may be a 'transmit' control channel used by a peer device that is transmitting a data frame and a 'receive' control channel used by a peer device that is receiving a data frame.

According to some embodiments, multiple control signal transmission attempts may be possible, e.g., both for communications on the transmit control channel and on the receive control channel. In such scenarios, initial transmissions may have different transmission characteristics than retransmissions. For example, a (low power) multi-tone transmission may be initially performed when transmitting via the transmit control channel, and if not successful (e.g., if no acknowledgement is received via the receive control channel), a subsequent (higher power) single-tone transmission may be performed. Such flexibility may provide good reliability without excessive power and communication medium resource usage, at least according to some embodiments.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
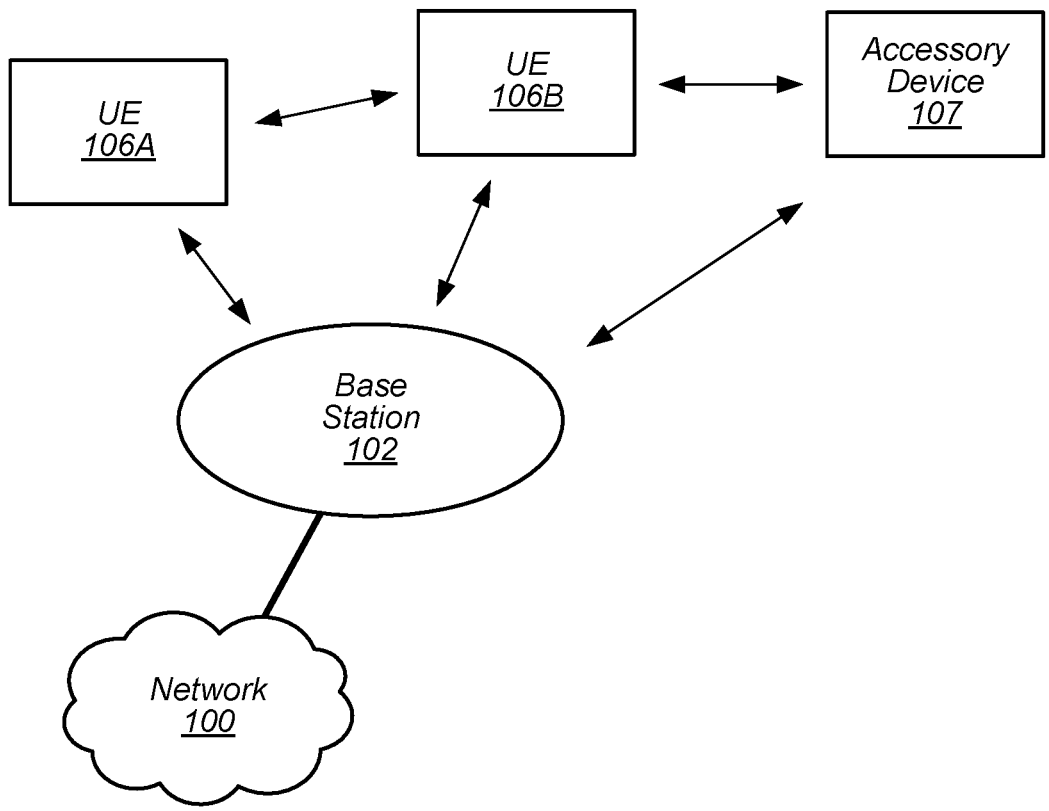
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

Figure 2:
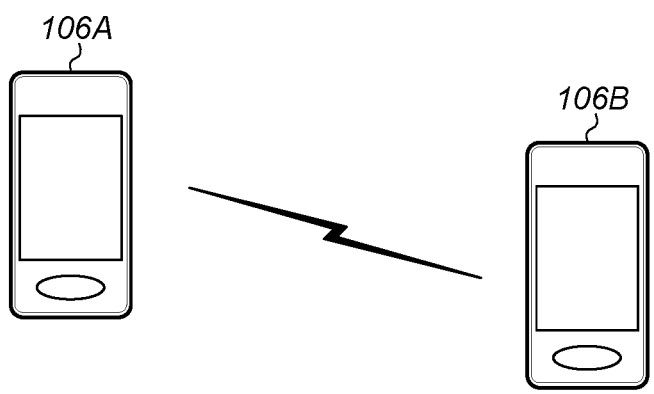
FIG. 2 illustrates an example wireless communication system in which two wireless devices can perform direct device-to-device communication, according to some embodiments.

FIG. 2—Device-to-Device Communication

The UE 106B may also be configured to communicate with the UE 106A. For example, the UE 106A and UE 106B may be capable of performing direct device-to-device (D2D) communication (e.g., Off Grid Radio Service or OGRS). The D2D communication may be supported by the cellular base station 102 (e.g., the BS 102 may facilitate discovery, among various possible forms of assistance), or may be performed in a manner unsupported by the BS 102. In some embodiments, BS 102 may not be present in the vicinity of UEs 106A and 106B. For example, according to at least some aspects of this disclosure, the UE 106A and UE 106B may be capable of arranging and performing narrowband D2D communication with each other even when out-of-coverage (OOC) of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features described herein, such as any of the features or steps of the method of FIG. 5.

According to some embodiments, OGRS may operate in unlicensed low ISM bands, e.g., between 700 MHz and 1 GHz or in 2.4 GHZ ISM band, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

Figure 3:
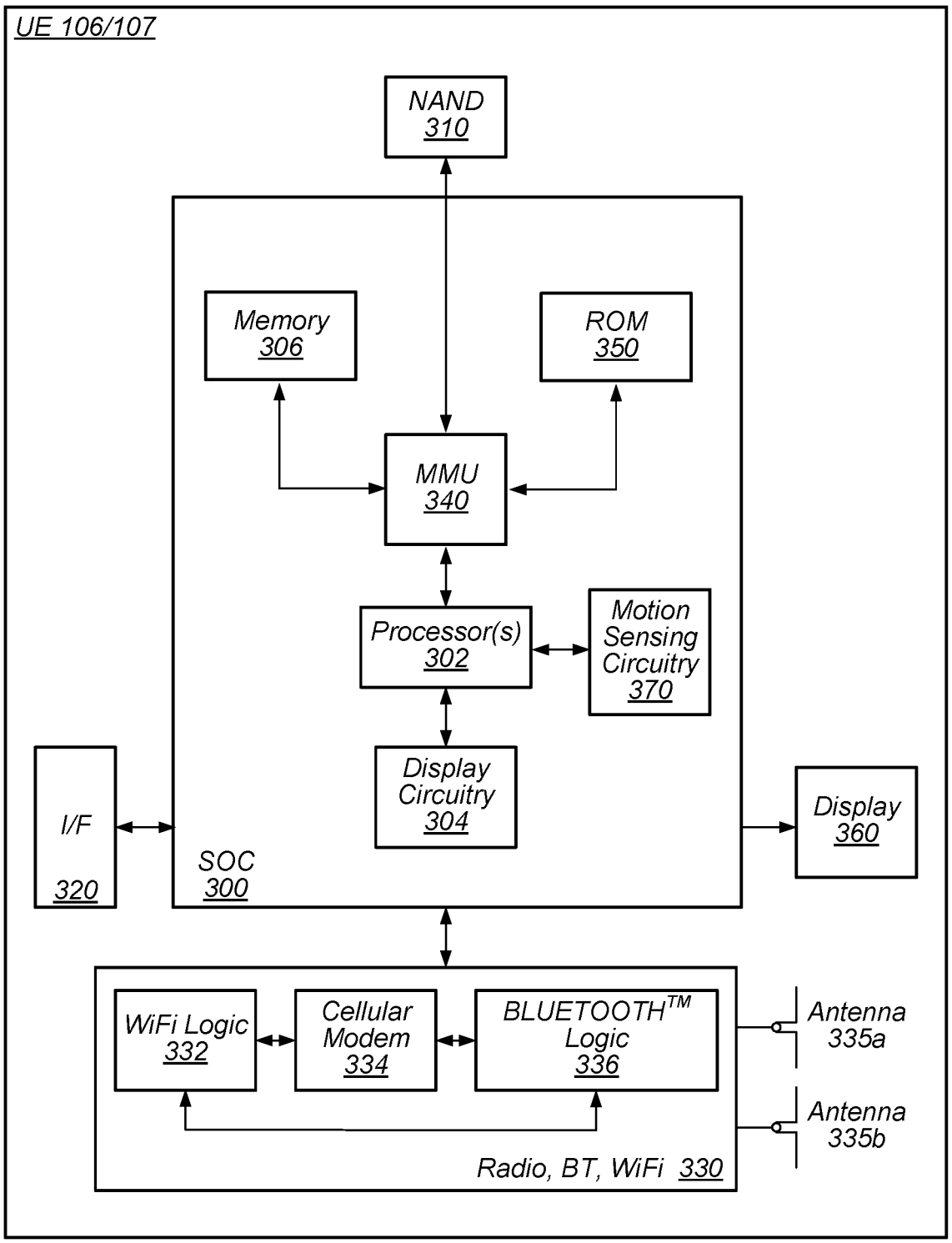
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
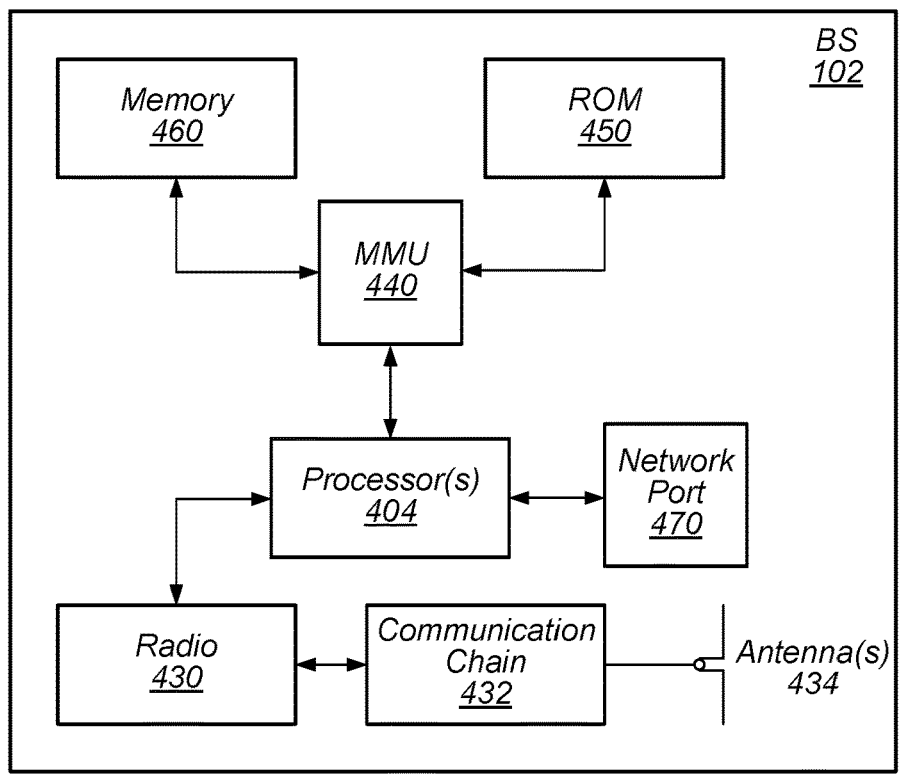
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, NR and LTE, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
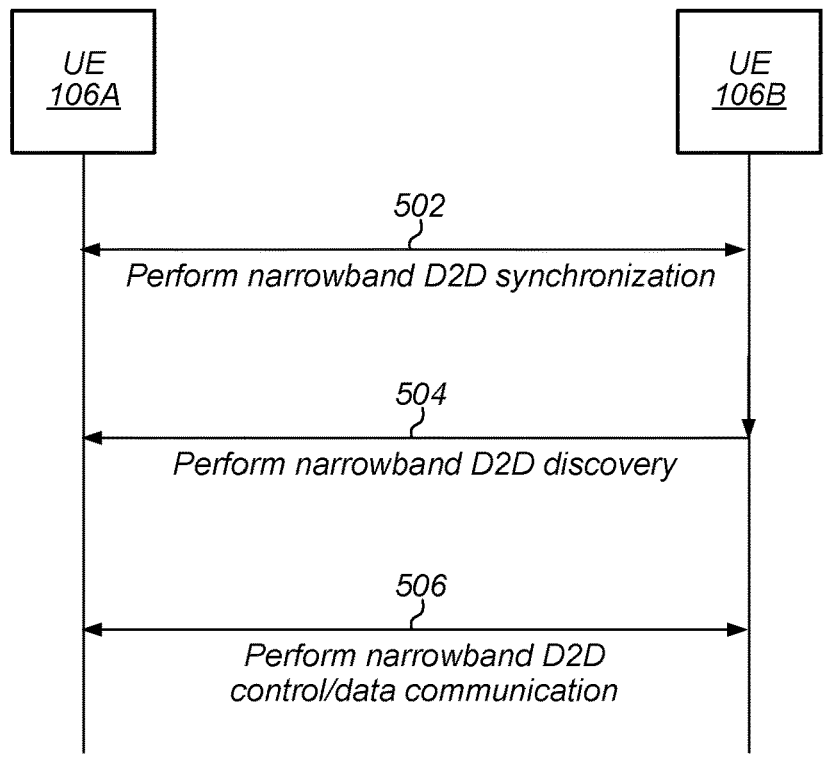
FIG. 5 is a communication flow diagram illustrating an exemplary method for performing narrowband device-to-device wireless communication, according to some embodiments.

FIG. 5—Communication Flow Diagram

FIG. 5 is a communication flow diagram illustrating a method for performing narrowband device-to-device wireless communication. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

In 502, the wireless device may perform device-to-device (D2D) synchronization. The D2D synchronization may be performed on a frequency channel having a frequency width of one physical resource block (PRB), e.g., approximately 200 kHz, according to some embodiments. In some instances, multiple such "narrowband" frequency channels may be used to perform the synchronization. For example, two PRB may be used for synchronization in some embodiments, e.g., related to D2D using multiple different cellular IDs. Alternatively, or additionally, multiple PRBs (e.g., six PRBs, as one example) may be used in some embodiments, such as those in which a single cell_id is used for multiple D2D communication groups.

According to some embodiments, the D2D synchronization may be performed while the wireless device is out-of-coverage (OOC), e.g., with respect to any cellular base stations (or at least with respect to cellular base stations with which the wireless device is configured to communicate). Alternatively, the wireless device may attempt/perform D2D synchronization even when within coverage range of one or more cellular base stations, if desired. In such a case, the wireless device may determine that it is OOC (or otherwise determine to attempt D2D synchronization) and monitor appropriate resources (e.g., a sidelink communication band, among other possibilities) for D2D synchronization signals (e.g., Narrowband IoT D2D Primary/Secondary Synchronization Signals or NDPSS/NDSS) based on determining to attempt D2D synchronization. If the wireless device is unable to decode any synchronization signals while monitoring the D2D synchronization resources, the wireless device may transmit D2D synchronization signals itself. If the wireless device is able to receive and decode D2D synchronization signals, the wireless device may synchronize with those signals.

According to some embodiments, the D2D synchronization signals may include primary and secondary synchronization signals. In some embodiments, the D2D synchronization signals may be based on NarrowBand IoT (NB-IoT) technology, such as may be considered or adopted by 3GPP, among other possibilities. In exemplary embodiments, such signals may be NDPSS/NDSSS. Additionally, or alternatively, D2D synchronization signals may be referred to variously as sidelink narrowband primary synchronization signals (SNPSS) or direct narrowband primary synchronization signals (DNPSS), sidelink narrowband secondary synchronization signals (SNSSS), direct narrowband secondary synchronization signal (DNSSS), primary/secondary sidelink synchronization signals (PSSS/SSSS), or in any of various other manners. The synchronization signals may further include a D2D master information block (MIB), which may be transmitted on various channels such as described by NB-IoT or a sidelink narrowband physical broadcast channel (SNPBCH), in some embodiments. Alternatively, the MIB may be considered separate from the synchronization signals, according to some embodiments. The synchronization signals may be collocated with respect to frequency channel (e.g., may be transmitted in the same 1PRB frequency channel or same set of narrowband frequency channels), at least in some instances. The D2D MIB may indicate which portions of the frequency channel are allocated for any or all of D2D synchronization signals, D2D discovery messages, D2D control communications, and/or D2D data communications. Alternatively, at least some of these allocations may be indicated in discovery messages or in other messages. Note that these examples of D2D synchronization signal characteristics are not intended to be limiting, and that numerous other D2D synchronization techniques and characteristics are also possible.

In 504, the wireless device may perform D2D discovery with a second wireless device. The D2D discovery may be performed using various resources. Such resources may be determined based on the D2D synchronization signals or otherwise may be determined using NB-IoT techniques, among various possibilities. In some embodiments, discovery may be performed using a sidelink narrowband physical discovery channel (SNPDCH) or other discovery channel allocated within a frequency channel comprising a frequency width of one PRB. As another possibility, discovery may be performed using multiple such narrowband frequency channels.

According to some embodiments, part of performing D2D discovery may include establishing resources available for data communication between the wireless device and the second wireless device, or at least initial resources for control and data communication between the wireless device and the second wireless device. For example, a system frame/subframe number and frequency carrier channel to be used to initiate the control/data communication may be selected.

In 506, the wireless device may perform D2D communication, e.g., including control and/or data communications, with the second wireless device. For example, the wireless device may initiate transmission of a data frame by transmitting a control communication on a control channel at the system frame/subframe number and frequency carrier channel specified for initiating control and data communication between the wireless device and the second wireless device, or may receive control communication initiating transmission of a data frame from the second wireless device using such resources.

The control communication may be performed using NB-IoT based techniques, among other possibilities. The control communication may be performed using one or more control channels, such as a sidelink narrowband physical control channel (SNPCCH), a physical transmit control channel (PTCCH), a physical receive control channel (PRCCH), etc. The data communication may be performed using a physical shared channel (PSCH), e.g., a sidelink narrowband physical shared channel (SNPSCH), according to some embodiments. The control and/or data communications may be performed in a different (e.g., 1PRB) frequency channel or set of frequency channels than the synchronization and/or discovery communications, if desired, or may be performed in the same frequency channel or set of frequency channels as the synchronization and/or discovery communications. For example, two or more frequency channels each comprising a frequency width of one PRB may be aggregated to perform the D2D discovery and communication, such that a first frequency channel is used for D2D discovery, and a second frequency channel is used for D2D control and data communications, as one possibility.

Note also that, if desired, a frequency hopping scheme may be employed with respect to the narrowband D2D communication. For example, the wireless device may periodically hop to a different frequency channel (e.g., also comprising a frequency width of one PRB) to perform the D2D synchronization, discovery, and communication according to a predetermined frequency hopping pattern. Other wireless devices following the same synchronization scheme may also follow the same frequency hopping pattern. For example, frequency hopping for synchronization and MIB transmission may be performed according to a scheme configured such that the average amount of time that a wireless device transmits on any given frequency channel is below a desired value (e.g., below a duty cycling parameter), according to some embodiments.

According to some embodiments, the control and data communications may include the use of multiple control channels, such as a PTCCH and a PRCCH. As previously noted, at least in some instances, resources for at least initial control communications may be negotiated during discovery communication between the wireless device and the second wireless device. Thus, for example, the PTCCH and PRCCH may be transmitted at a time and frequency indicated in MSG1/MSG2 discovery messages, according to some embodiments.

According to some embodiments, a transmitting device (which may be either peer device, and may change at various times such that both peers may have an opportunity to be the transmitting device at different times) may transmit first control information (e.g., using the PTCCH), which may indicate an amount of data (e.g., a buffer status report) that the transmitting device has to send to the receiving device. The first control information may also or alternatively include any of various other information, if desired, such as a frequency hopping pattern to be used for further control and data communication between the peer devices, an indication of a transmit power used to communicate the first control information, an indication of a transport format for the first control information, etc.

The receiving device may transmit second control information (e.g., using the PRCCH) to the transmitting device in response to the first control information. The second control information may include an acknowledgement indication (e.g., a positive or negative acknowledgement) for the first control information. The second control information may also or alternatively include any of various other information, if desired, such as an indication of a transport format for a data communication to be performed by the transmitting device, a transmit power control indication (e.g., to indicate whether to increase or decrease or leave unchanged a transmit power level used to transmit the first control information), a burst duration indication (e.g., to indicate a burst duration for the data communication being scheduled), etc.

According to some embodiments, it may be possible to utilize two regions for communication of the first and/or second control information, e.g., to potentially be able to benefit from a lower power multi-tone configuration if channel conditions are good enough to support such a configuration, while also providing the possibility of a higher power single tone configuration to increase the likelihood that control information exchange is possible in poor channel conditions. For example, a first transmission (e.g., an initial transmission) of the first control information may be performed using a multi-tone transmission configuration, and a second transmission (e.g., a retransmission) of the first control information may be performed using a single-tone transmission configuration if the first transmission of the first control information is unsuccessful. Similarly, a first transmission of the second control information may be performed using a multi-tone transmission configuration if the first transmission of the first control information is successful, and a second transmission of the second control information may be performed using a single-tone transmission configuration if the first transmission of the first control information is unsuccessful.

According to some embodiments, the transmitting device may determine that the first transmission of the first control information is successful if it receives the first transmission of the second control information with a positive acknowledgement indication, and may determine that the first transmission of the first control information is unsuccessful if it receives the first transmission of the second control information with a negative acknowledgement indication or is unable to detect/decode the first transmission of the second control information (e.g., at a time at which the first transmission of the second control information is expected).

Thus, according to such an arrangement, the second transmission of the first control information (if used) may generally be a re-transmission in response to an unsuccessful first transmission, and it may be possible that a second transmission of the second control information could be performed after a first transmission of the second control information is performed (e.g., if the first transmission of the second control information was not received or included a negative acknowledgement). However, note also that it may also be possible that a second transmission of the second control information could be performed without a first transmission of the second control information, e.g., if a wireless device did not receive the first transmission of the first control information.

If the first transmission of the first control information and the first transmission of the second control information are both successful, the resources that might otherwise have been used for the second transmission of the first control information and the second transmission of the second control information may be used to immediately begin data communication between the wireless device and the second wireless device, according to some embodiments. Alternatively, if desired, the wireless device and the second wireless device may enter a reduced-power state (e.g., sleep) for the duration of those resources, among various other possibilities.

Once the second control information is successfully received by the transmitting device, the transmitting device may transmit a data communication to the receiving wireless device, e.g., using the configuration negotiated in the exchange of the first control information and the second control information. The receiving device may transmit an acknowledgement indication to the transmitting device in response to the data communication.

According to some embodiments, such an exchange of first and second control information, together with a data communication period including interleaved data communications and acknowledgement indications, may be considered to form a data frame according to the D2D communication framework. It may be the case that each such frame is communicated on a single frequency channel carrier, but that (e.g., in accordance with a frequency hopping pattern negotiated between the peers) different frames are communicated on different frequency channel carriers. Other frequency hopping arrangements are also possible.

According to some embodiments, after each such data frame (or at another configured interval), the peer devices may utilize a mechanism to determine which device will be the transmitting device for the next data frame (or other interval). For example, each of the transmitting device and the receiving device may have a mechanism to indicate a request to reserve the next set of resources configured between the peer devices, and each device may implement a proportional fair algorithm to determine which device will actually use the resources, e.g., based on the buffer data available at the device and how much the device has (e.g., recently) made use of the resources. Other mechanisms for arbitrating resource usage for the D2D link between the peer devices are also possible.

In some embodiments, the resources available for communication between the wireless device and the second wireless device may expire after a certain amount of time has passed since discovery was performed. For example, a timer may be initiated at discovery, and after expiry of such a "discovery timer", the D2D link between the wireless device and the second wireless device may be considered stale. Thus, at some point, the wireless device (and/or the second wireless device) may determine that the resources available for the communication between the wireless device and the second wireless device have expired. In this case (e.g., assuming the wireless device wishes to continue communicating with the second wireless device and/or vice versa), one of the wireless device or the second wireless device may re-initiate discovery, e.g., based at least in part on determining that the resources available for the communication between the wireless device and the second wireless device have expired.

As another possibility, such a timer could be extended when one or more triggers occur. For example, in some embodiments, each peer device may reset or otherwise extend the discovery timer upon each successful data frame communication, and/or upon exchange of 'keep-alive' communications between the peer devices, among various possibilities.

Thus, using the techniques described herein, peer devices may be able to perform D2D synchronziation, discovery, and control and data communications according to a D2D framework, potentially without a centralized network scheduler. Such techniques may accordingly extend the range of possible usage scenarios for wireless devices configured to utilize them, at least according to some embodiments.

FIGS. 6-9—Additional Information

FIGS. 6-9 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Figure 6:
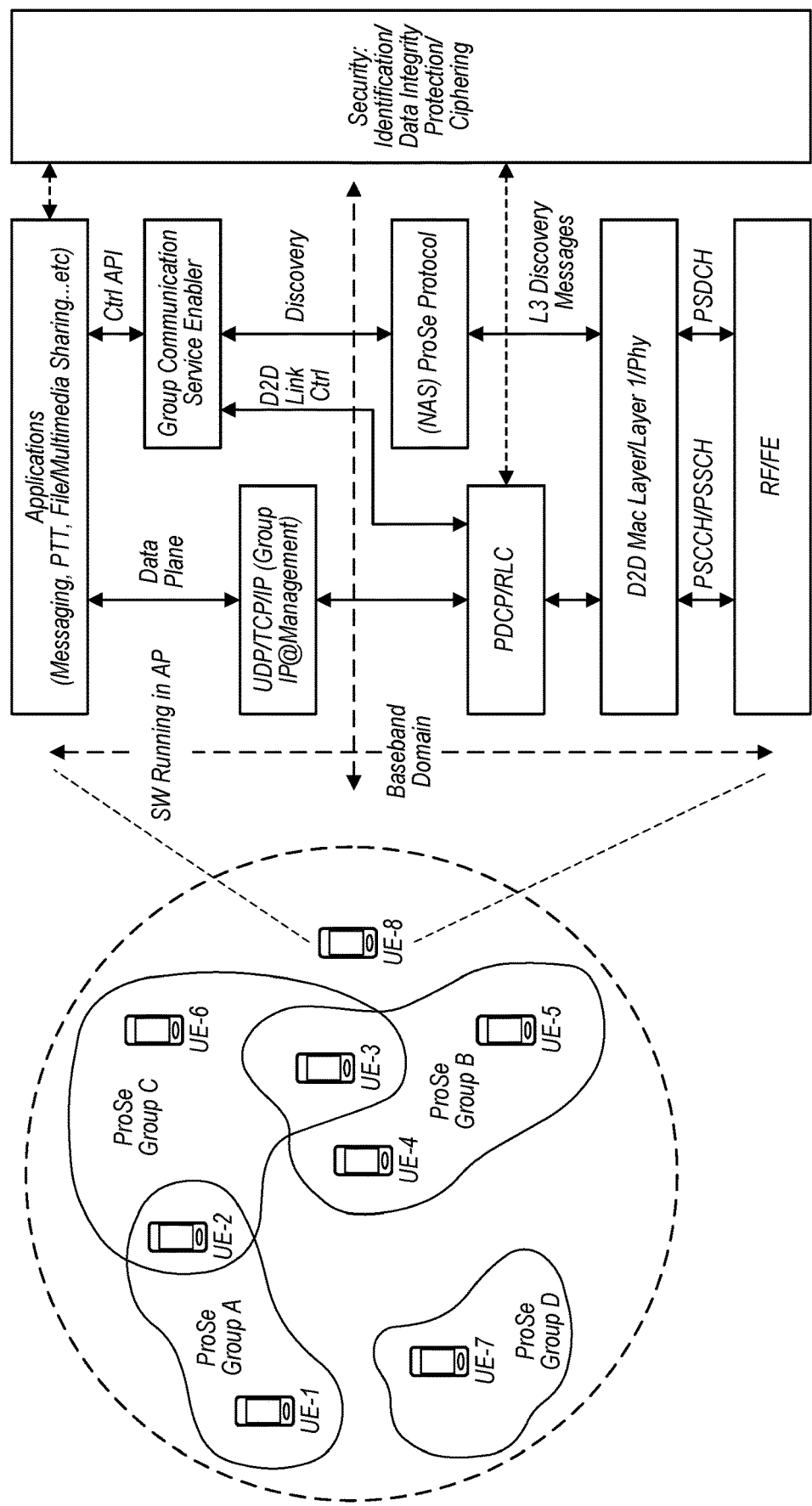
FIG. 6 illustrates aspects of an exemplary cellular network supported device-to-device communication architecture, according to some embodiments.

FIG. 6 illustrates aspects of an exemplary cellular network supported device-to-device communication architecture, according to some embodiments. In particular, an end-to-end architecture for 3GPP "ProSe" (proximity services) direct link communication is shown, in which various UEs form ProSe groups. Each UE participating in such ProSe communication may implement a ProSe stack, including applications and user datagram protocol (UDP)/transport control protocol (TCP)/internet protocol (IP) layers in software executing on an application processor, along with a group communication service enabler. The ProSe stack may also include a packet data convergence protocol (PDCP)/radio link control (RLC) layer, a non-access stratum (NAS) ProSe protocol layer, a D2D media access control (MAC/layer 1/physical (PHY) layer, as well as a RF front end, implemented in the baseband domain. The ProSe stack may also include a security layer for identification/data integrity protection/ciphering. As noted above, various embodiments of this disclosure may be implemented without cellular network support (e.g., in OOC scenarios, OGRS, etc.). Thus, in at least some embodiments, ProSe groups, ProSe protocols, etc., may not be employed.

Figure 7:
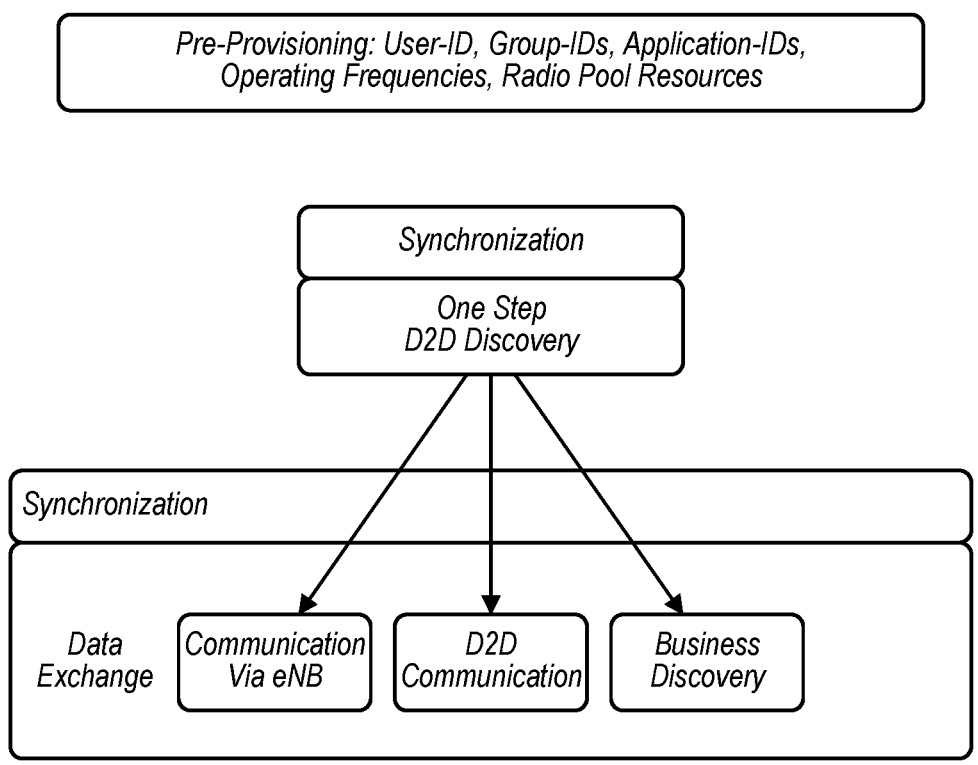
FIG. 7 illustrates various possible device-to-device communication related operations in an exemplary cellular network supported device-to-device communication framework, according to some embodiments.

FIG. 7 illustrates various possible device-to-device communication related operations in an exemplary cellular network supported device-to-device communication framework, according to some embodiments. As shown, one such operation may include pre-provisioning, e.g., in which a UE device is provided (e.g., by a cellular network to which it is subscribed) with user identification information, group identification information, application identification information, D2D operating frequency information, radio pool resources, etc. Once pre-provisioned, a UE may perform synchronization and D2D discovery. Once discovery is complete, data exchange synchronization may further occur, as well as actual data exchange, which may include any combination of communication by way of a base station (e.g., an eNB), D2D communication, or business discovery.

When a UE device is within coverage range of a cellular network in a cellular network supported device-to-device communication framework, synchronization for the UE device may be derived from downlink primary synchronization signals (PSS) and secondary synchronization signals (SSS) transmitted by a cellular base station. Outside network coverage areas, D2D synchronization signals may be transmitted by UEs to provide synchronization signals between D2D devices and to avoid interference. Examples of such synchronization signals may include, but are not limited to primary/secondary sidelink synchronization signals (PSSS/SSSS) and/or sidelink master information block (MIB_SL). In order to avoid multiple synchronization sources, a process may be defined to elect a single UE (e.g., a "SyncRef UE" or a "master UE") within a given area to act as a synchronization source.

Figure 8:
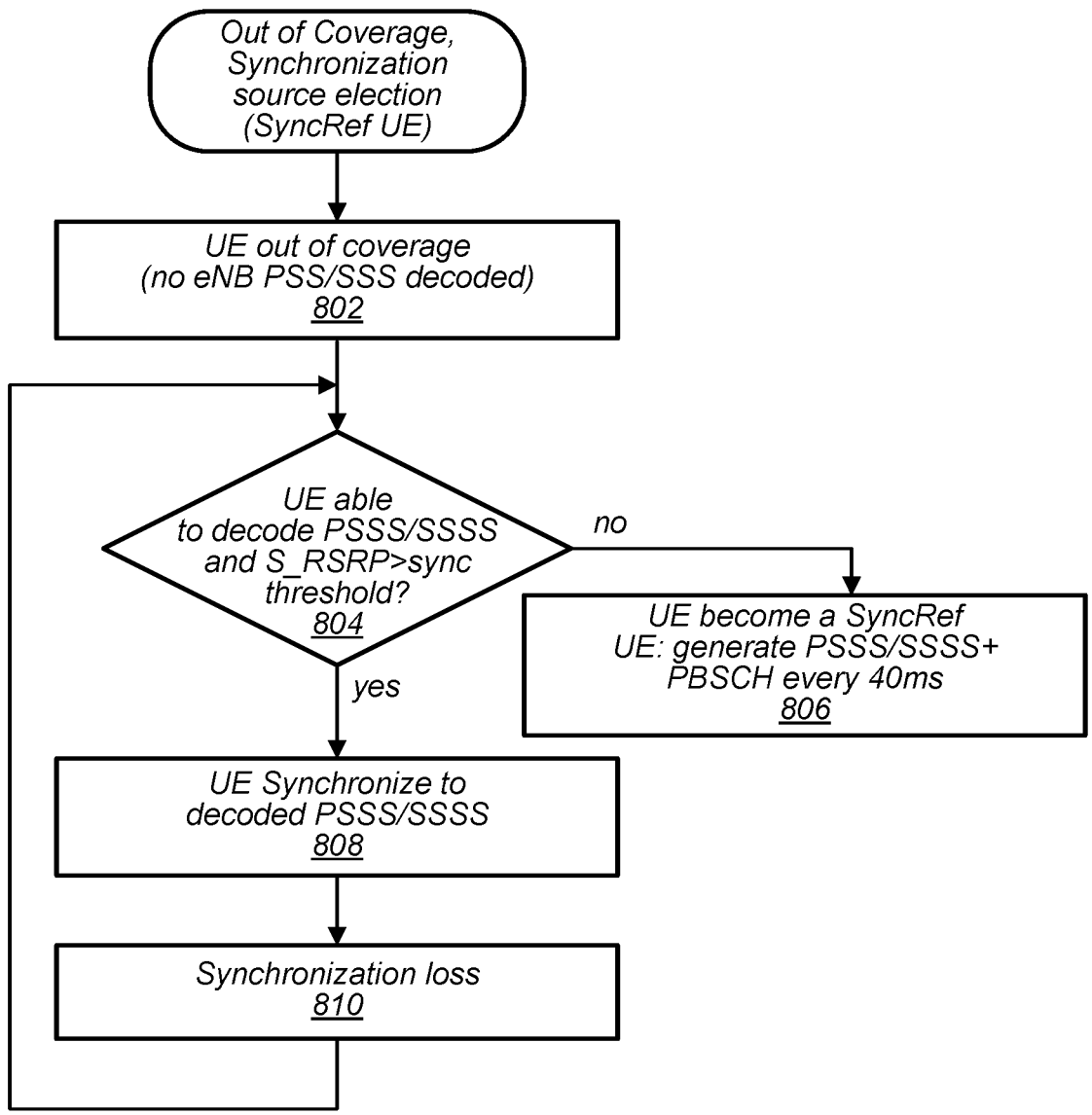
FIG. 8 is a flowchart diagram illustrating an exemplary method for determining how to perform synchronization for device-to-device communications when out-of-coverage in an exemplary cellular network supported D2D communication framework, according to some embodiments.

FIG. 8 is a flowchart diagram illustrating such an exemplary possible decision making process for determining how to perform synchronization for device-to-device communications when out-of-coverage in an exemplary cellular network supported device-to-device communication framework, according to some embodiments. Note that such a process may also or alternatively be used for performing D2D synchronization according to a device-to-device communication framework that is not cellular network supported, if desired.

As shown, in 802, initially the UE device may determine that it is out of coverage (e.g., that no eNB PSS/SSS is decoded).

Having determined that the UE device is out of coverage, in 804, the UE may determine whether it is able to decode any D2D synchronization signals with signal strength (e.g., Synchronization Reference Signal Received Power or "S_RSRP") above a certain threshold (e.g., S_RSRP>sync threshold?). For example, in some embodiments, such a threshold may be S_RSRP>−130 dBm. Other values are also possible.

If the UE is unable to decode any D2D synchronization signals with sufficient signal strength, the UE may transition to 806, becoming a SyncRef UE and generating and transmitting D2D synchronization signals and physical sidelink broadcast channel (PSBCH) information (e.g., the MIB_SL) according to a specified periodicity (e.g., every 40 ms, as one possibility).

If the UE is able to decode D2D synchronization signals with sufficient signal strength, the UE may transition to 808, synchronizing to the decoded D2D synchronization signals. Eventually, in 810, the UE may lose synchronization to these D2D synchronization signals, and the UE may return to step 804 to again determine whether another SyncRef UE is available or whether the UE will become a SyncRef UE.

Once synchronized, the UE may be configured to perform discovery communication, and potentially also control and data communication, with peer devices within communication range of the UE that have also obtained synchronization.

For D2D communication, once discovery procedure is finished (e.g., including successful UE authentication), a data communication session may be established.

As previously noted, in some embodiments, D2D communications may lack a centralized network scheduler, e.g., when performed when OOC with respect to cellular network support or when otherwise performed in a manner unsupported by a cellular network. Accordingly, UEs may need to first exchange control information to establish the link for data communication. In some embodiments, a control channel (e.g., similar to or different from a 3GPP physical downlink control channel (PDCCH)) may be used for both transmitting UEs and receiving UEs. Similarly, a shared channel (e.g., similar to or different from a 3GPP physical downlink shared channel (PDSCH)) as scheduled by the control channel may then carry data.

In some embodiments, a physical transmit control channel (PTCCH) may carry information sent by the UE initiating the communication. The PTCCH may be a PDCCH-like channel (e.g., with respect to structure and coding, with the use of convolutional turbo coding (CTC) or tail biting convolutional codes (TBCC)), as one possibility. In one embodiment, its CRC may be scrambled by the link ID (e.g., the D2D or P2P ID, possibly similar in concept as a cell radio network temporary identifier (C-RNTI) according to 3GPP). The PTCCH may carry information such as a buffer status report (BSR) that may indicate the size of the upcoming communication payload. The receiving UE, based on a chosen transport block size (TBS) format (e.g., which may be selected by the receiving UE), may be able to determine the duration of the transmission and how long it needs to be awake for reception. Other potential information or fields of the PTCCH may include, for example, frequency hopping pattern, transmit power, transport format for PTCCH (although this may be optional, as it may be the same as or determined from the one used for a physical receive control channel ((PRCCH)), etc.

In some embodiments, the PTCCH may be divided into two regions: a single tone transmission region and a multi tone transmission region. Such a mechanism may be useful, at least in some embodiments, since in initial link establishment, channel condition information may not be available to both UEs, and even if at least some channel condition information is available, e.g., from discovery phase, it may be the case that only partial information is available.

Accordingly, in some embodiments, the transmitting UE may start by sending a PTCCH communication using a multi tone transmission (e.g., at low power), followed by using a single tone transmission if the multi-tone transmission failed (e.g., if no feedback is received, such as if no PRCCH is received, or if a NACK is indicated in the PRCCH) from the receiving UE. Hence, in one embodiment, the time structure may be PTCCH (Multi-tone) followed by PRCCH (Multi-tone) followed by PTCCH (single tone) followed by PRCCH (single tone). However, it should be noted that alternatives are also envisioned. For example, if the multi-tone transmission is successful, the single tone PTCCH and/or PRCCH transmission(s) may not be needed, hence the resources reserved for single tone PTCCH/PRCCH could be directly used by the data channel. As another possibility, if the multi-tone transmission is successful, the UEs may go to sleep during the duration of the reserved resources for single tone transmission, then subsequently wake up to perform the scheduled data communication.

The PRCCH may be used to respond to a PTCCH communication (e.g., as described previously herein) and/or to provide acknowledgement or negative acknowledgement in response to data channel communications. To support such multiple use cases, in some embodiments, the PRCCH may include two (or more) formats.

A first format (format 1, also referred to as PRCCH1) may be used as a response to PTCCH in the initial link establishment of the data channel. In some embodiments, its structure (e.g., PHY, coding, modulation and timing) may be similar to the PTCCH (e.g., similar to a 3GPP PDCCH, when using a single tone configuration). However, since the payload may be small, in a multi-tone configuration, a design similar to a 3GPP PUCCH design (1PRB) could be used, with time domain repetitions. In format 1, the channel may include or carry an acknowledgement/negative acknowledgement indication (A/N, e.g., 1 bit), a transport format indication (e.g., modulation and coding scheme (MCS), number of repetitions, etc.) (e.g., 3 bit), a transmit power control (TPC) indicator (e.g., 1 or 2 bits, e.g., to indicate if a transmit power increase or decrease is requested), burst duration (e.g., an optional field of 2, 3 bits), etc. In some embodiments, it may also indicate a number of repetitions of the PTCCH to use, e.g., for a subsequent PTCCH transmission attempt if the PTCCH is not successfully received and the PRCCH includes a Nack indication. Note that variations on or alternatives to such a PRCCH1 format are also possible.

A second format (format 2, also referred to as PRCCH2) may carry only an Ack/Nack and may be sent in response to data channel transmission(s). In some embodiments, format 2 may be similar to NPUSCH format 2 from NB-IoT 3GPP, e.g., it may either include 1 subcarrier of 15 KHz and 1 resource unit (RU) of length 2 ms, or 1 subcarrier of 3.75 KHz of 1 RU of length 8 ms. Other PHY implementation alternatives could include an LTE PUCCH format with Zadoff-Chu (ZC) sequences scrambling to indicate the linkID, e.g., similar to possible C-RTNI-like scrambling of the CRC in format 1. The format to be used can be deduced from the PRCCH (e.g., the PRCCH1) and the data channel transport format or can be indicated by PRCCH fields explicitly.

Alternatively, Format 2 could be configured to convey an A/N bit and 1 bit for a TPC indicator. In this case, it could be designed in a similar manner to PRCCH format 1, e.g., with 2 options/transmission regions (e.g., single tone and multi tone). Note that any number of further variations on or alternatives to such a PRCCH2 format are also possible.

Exchange of PTCCH and PRCCH communications between a pair of peers may configure a physical shared channel (PSCH) as the data channel for use between the pair of peers. The PSCH may carry data information, e.g., potentially similar to a 3GPP PDSCH design and coding scheme at the physical layer.

The PSCH may support multiple possible transport formats; the transport format to be used in a given communication may be indicated by the MCS indicated in the PRCCH. Communications on the PSCH may be interleaved with communications on the PRCCH (e.g., format 2) in the time domain, in some embodiments. For example, for every transport block transmission provided on the PSCH, there may be an A/N response provided on the PRCCH2.

If desired, after every successful PSCH transport block transmission, the receiving UE may send a PRCCH1 to the transmitting UE, e.g., to inform the transmitting UE if there is a change of power/MCS requested (e.g., due to a change in channel conditions, or for any of various other possible reason).

As another possibility, the PRCCH1 could be sent only once per frame, e.g., in which case the peer devices may assume that all TBs in a frame will use the same TBS and transport format.

The PSCH could be designed to support multiple TBs (e.g., per RLC segment) per frame (e.g., 300 ms, to facilitate overall dwell time on any given frequency channel remaining below a desired duty cycle) per frequency channel (PRB), according to some embodiments. Since the PTCCH may carry buffer status report information, it may be possible to send such information only once in the first frame for the first payload (or TB). The PTCCH may be transmitted again after the whole payload (all RLC+TBs) is transmitted successfully. Alternatively, it may be possible to transmit the PTCCH in every frame, e.g., with the BSR information being updated to indicate the remaining data in the buffer.

Figure 9:
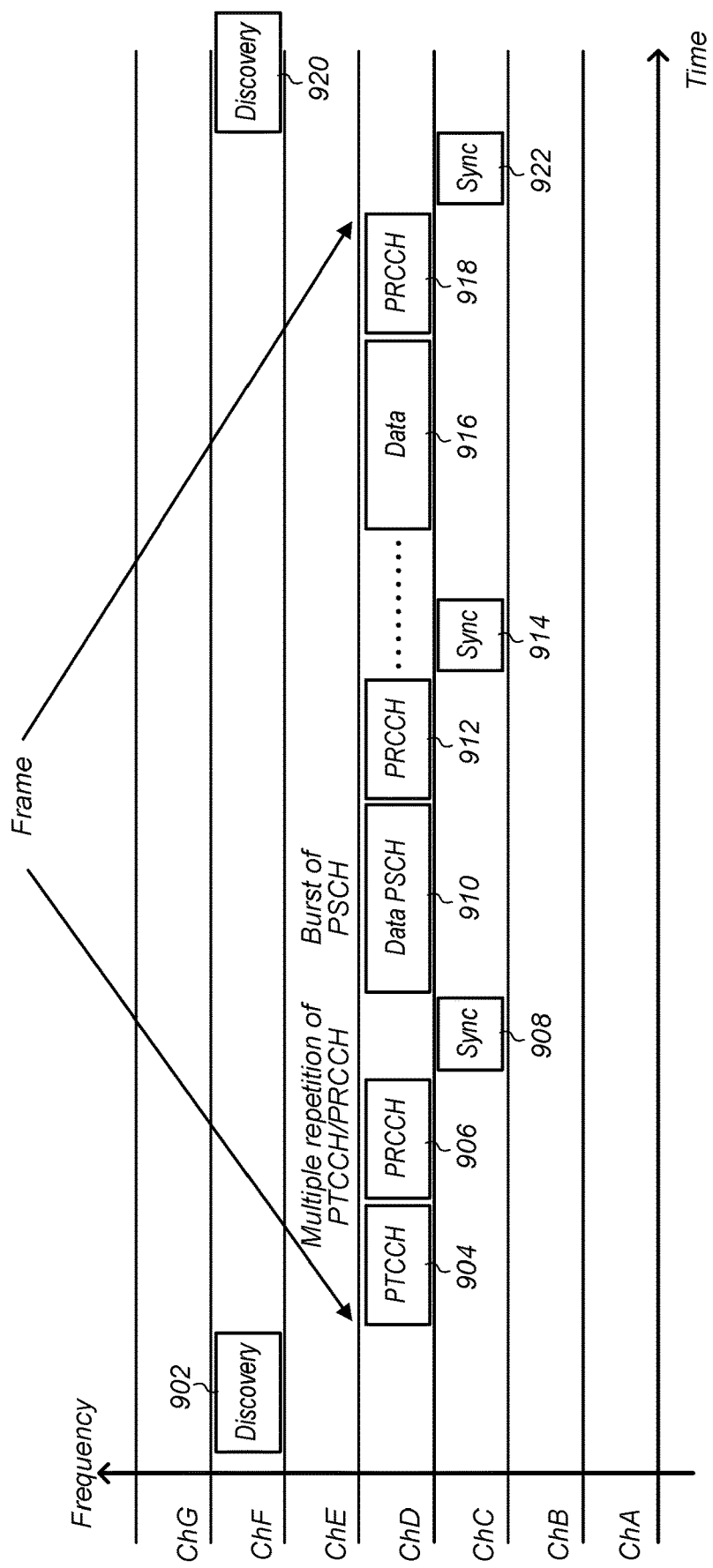
FIG. 9 illustrates an example of possible time use of various physical layer channels for narrowband device-to-device communication, according to some embodiments.

FIG. 9 illustrates various physical layer channels that could be used for narrowband device-to-device communication, e.g., including PTCCH and PRCCH control channels and a PSCH data channel, according to some embodiments. As shown, synchronization communications 908, 914, 922 may be performed on one narrowband frequency channel (e.g., PRB), while discovery communications 902, 920 may be performed on another narrowband frequency channel. Each frame of data communication may similarly be performed in a single narrowband frequency channel (1 PRB), though different frames may hop to different frequency channels.

As shown, each frame may include a PTCCH 904 and PRCCH1 906 (possibly repeated, e.g., using single tone communication if multi-tone communication is unsuccessful), then may further include PSCH transmissions 910, 916 interleaved with either PRCCH1 (e.g., for A/N and updating MCS, if needed/after a full transport block) or PRCCH2 (e.g., for just providing an A/N indication) transmissions 912, 918, e.g., as previously described herein. As shown, at least in some instances, gaps between PSCH bursts and A/N indications may be left for the D2D group sync signals 908, 914, 922, if desired.

Each PSCH transmission may be configured to have a configured burst duration. According to some embodiments, the minimum duration may be 4 ms, which may correspond to a TB of 1 ms that is repeated over 4 ms (e.g., 4 redundancy versions may be transmitted) and the maximum duration may be 64 ms, e.g., for single tone (e.g., to comply with a potential power amplifier constraint if transmitting at 30 dBm). Other burst durations (e.g., including different minimum/maximum durations) are also possible.

Note that the burst duration could be implicit, if desired. For example, for each of the exemplary transport formats described subsequently herein, a certain burst duration (number of repetitions) may always be used (e.g., a TB may be repeated 4 times in addition to the repetitions defined for each transport format). Alternatively, the burst duration could be explicitly transmitted in the PRCCH1 (e.g., in a 2 or 3 bit field, as previously discussed herein).

According to some embodiments, it may be preferable for the frame duration of PTCCH+PRCCH+PSCH to not exceed 400 ms, e.g., to comply with regulations (e.g., the US federal communication commission (FCC) may require an average duty cycle on any given frequency of less than 2%, for some regulated unlicensed frequency bands, according to some embodiments).

Thus, each frame may be transmitted in one frequency carrier channel, with subsequent frames being transmitted in different frequency carrier channels, e.g., according to a frequency hopping pattern. The frequency hopping pattern could be determined by the link-ID (e.g., an identifier used in a similar manner as a C-RNTI) of the UE pairs. The PTCCH could be used to indicate the starting position of the pattern.

As previously discussed herein, it may be possible to support multiple transport block configurations. According to some embodiments, any or all of the following configurations may be supported: Single tone—TBS72/QPSK—2RU Single tone—TB104/BPSK—1RU Single tone—TBS328/QPSK—2RU Multi tone—TBS144/QPSK—4Repetition Multi tone—TBS104/QPSK—1Repetition Multi tone—TBS224/16QAM—1Repetition Multi tone—TBS328/16QAM—1Repetition Multi tone—TBS712/16QAM—2Repetition Other configurations are also possible.

According to some embodiments, the resources available for D2D communications between a pair of peers may be considered valid as long as their discovery is valid. Discovery between a pair of peers may be considered valid for a certain length of time after discovery is performed between those peers. For example, a timer may be used to measure how long remains until a set of resources established during a discovery communication exchange become stale. As long as the timer has not expired, communication between the peers may be started by communication of the PTCCH/PRCCH. Once the timer expires, or if the PRCCH/PTCCH repetitions fail, discovery may be re-initiated. If desired, the timer may be reset or otherwise modified after successful data frame communication. Alternatively, the timer may run continuously to expiration regardless of the degree to which the resources are used.

Once a peer that has initiated discovery has sent its first payload, the receiving peer may be expected to reply. As previously discussed, all the PHY channels may be established on a per link-ID (e.g., per peer-to-peer link) basis, hence a mechanism may be used to decide which UE will use the resources to transmit data at any given time. Any number of such mechanisms may be used. As one possibility, the following solution could be used.

The transmitting UE may use either a PTCCH reservation of resources field with a priority set, or an indication provided at the media access control (MAC) layer (e.g., carried by the PSCH), to indicate a desire to use the available resources to transmit data. The receiving UE may use a reservation of resources field at the end of the payload (it may know the last packet of the payload from the MAC and the BSR information), to indicate a desire to use the available resources to transmit data. A proportional fair algorithm could be used to decide which UE actually uses the resources, e.g., based on the buffer data available at each UE and how much the channel has been used by that UE. Such an algorithm could be run simultaneously on both UEs, e.g., such that each UE may be able to independently determine which UE will use the resources next at any given time based on the BSR information for each UE and the relative channel usage by each UE. The determined UE may initiate the next data communication frame, e.g., by transmitting a PTCCH communication.

In the following further exemplary embodiments are provided.

One set of embodiments may include a method, comprising: by a first wireless device: obtaining synchronization with a device-to-device (D2D) group; performing D2D discovery with a second wireless device in the D2D group, wherein performing the D2D discovery comprises establishing initial resources for control and data communication between the first wireless device and the second wireless device; transmitting first control information to the second wireless device, wherein the first control information indicates a buffer status of the first wireless device; receiving second control information from the second wireless device, wherein the second control information comprises an acknowledgement indication for the first control information; and transmitting a data communication to the second wireless device based at least in part on the first control information and the second control information.

Another set of embodiments may include a method, comprising: by a first wireless device: obtaining synchronization with a device-to-device (D2D) group; performing D2D discovery with a second wireless device in the D2D group, wherein performing the D2D discovery comprises establishing initial resources for control and data communication between the first wireless device and the second wireless device; receiving first control information from the second wireless device, wherein the first control information indicates a buffer status of the second wireless device; transmitting second control information to the second wireless device, wherein the second control information comprises an acknowledgement indication for the first control information; and receiving a data communication from the second wireless device based at least in part on the first control information and the second control information.

According to some embodiments, an acknowledgement indication is provided in response to the data communication.

According to some embodiments, the first control information further comprises an indication of a frequency hopping pattern to be used for further control and data communication between the first wireless device and the second wireless device.

According to some embodiments, the first control information further comprises an indication of a transmit power used to communicate the first control information.

According to some embodiments, the first control information further comprises an indication of a transport format for the first control information.

According to some embodiments, the second control information further comprises an indication of a transport format for the data communication.

According to some embodiments, the second control information further comprises a transmit power control indication.

According to some embodiments, the second control information further comprises a burst duration indication.

According to some embodiments, a first transmission of the first control information is performed using a multi-tone transmission configuration, wherein a second transmission of the first control information is performed using a single-tone transmission configuration if the first transmission of the first control information is unsuccessful, wherein a first transmission of the second control information is performed using a multi-tone transmission configuration if the first transmission of the first control information is successful, wherein a second transmission of the second control information is performed using a single-tone transmission configuration if the first transmission of the first control information is unsuccessful.

According to some embodiments, the method further comprises: determining that resources available for the communication between the first wireless device and the second wireless device have expired; and re-initiating D2D discovery with the second wireless device in the D2D group based at least in part on determining that the resources available for the communication between the first wireless device and the second wireless device have expired.

According to some embodiments, the method further comprises: determining which of the first wireless device or the second wireless device will transmit a subsequent data communication based at least in part on a proportional fair algorithm.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising a processing element configured to cause a first wireless device to:
   obtain synchronization with a device-to-device (D2D) group;
   perform D2D discovery with a second wireless device in the D2D group, wherein performing the D2D discovery comprises establishing initial resources for control and data communication between the first wireless device and the second wireless device;
transmit first control information to the second wireless device, wherein the first control information indicates a buffer status of the first wireless device, wherein a first transmission of the first control information is performed using a multi-tone transmission configuration, and wherein a second transmission of the first control information is performed using a single-tone transmission configuration if the first transmission of the first control information is unsuccessful;
receive second control information from the second wireless device, wherein the second control information comprises an acknowledgement indication for the first control information; and
transmit a data communication to the second wireless device based at least in part on the first control information and the second control information.

2. The apparatus of claim 1, wherein the processing element is further configured to cause the first wireless device to:
determine that resources available for the communication between the first wireless device and the second wireless device have expired; and
re-initiate D2D discovery with the second wireless device in the D2D group based at least in part on determining that the resources available for the communication between the first wireless device and the second wireless device have expired.

3. The apparatus of claim 1, wherein the processing element is further configured to cause the first wireless device to:
determine which of the first wireless device or the second wireless device will transmit a subsequent data communication based at least in part on a proportional fair algorithm.

4. The apparatus of claim 1,
wherein the first control information further comprises an indication of a frequency hopping pattern to be used for further control and data communication between the first wireless device and the second wireless device.

5. The apparatus of claim 1,
wherein the first control information further comprises an indication of a transmit power used to communicate the first control information.

6. The apparatus of claim 1,
wherein the first control information further comprises an indication of a transport format for the first control information.

7. The apparatus of claim 1, wherein the processing element is further configured to cause the first wireless device to:
receive an acknowledgement indication is provided in response to the data communication.

8. The apparatus of claim 1,
wherein the second control information is transmitted using a different control channel than the first control information.

9. A method, comprising:
by a first wireless device:
obtaining synchronization with a device-to-device (D2D) group;
performing D2D discovery with a second wireless device in the D2D group, wherein performing the D2D discovery comprises establishing initial resources for control and data communication between the first wireless device and the second wireless device;
transmitting first control information to the second wireless device, wherein the first control information indicates a buffer status of the first wireless device, wherein a first transmission of the first control information is performed using a multi-tone transmission configuration, wherein a retransmission of the first control information is performed using a single-tone transmission configuration if the first transmission of the first control information is unsuccessful;
receiving second control information from the second wireless device, wherein the second control information comprises an acknowledgement indication for the first control information; and
transmitting a data communication to the second wireless device based at least in part on the first control information and the second control information.

10. The method of claim 9, wherein receiving the first control information comprises:
receiving a first transmission of the second control information having a multi-tone transmission configuration if the first transmission of the first control information is successful; or
receiving a second transmission of the second control information having a single-tone transmission configuration if the first transmission of the first control information is unsuccessful.

11. The method of claim 9, wherein the first control information further comprises one or more of:
an indication of a frequency hopping pattern to be used for further control and data communication between the first wireless device and the second wireless device;
an indication of a transmit power used to communicate the first control information; or
an indication of a transport format for the first control information.

12. The method of claim 9, wherein the second control information further comprises one or more of:
an indication of a transport format for the data communication,
a transmit power control indication indicating a transmit power to use for the data communication; or
a burst duration indication indicating a burst duration to use for the data communication.

13. The method of claim 9,
wherein the first control information is transmitted using a different control channel than the second control information.

14. A wireless device, comprising:
an antenna;
a radio operably coupled to the antenna; and
a processing element operably coupled to the radio;
wherein the wireless device is configured to:
obtain synchronization with a device-to-device (D2D) group;
perform D2D discovery with a second wireless device in the D2D group, wherein performing the D2D discovery comprises establishing initial resources for control and data communication between the wireless device and the second wireless device;
receive first control information from the second wireless device, wherein the first control information indicates a buffer status of the second wireless device;

transmit second control information to the second wireless device, wherein the second control information comprises an acknowledgement indication for the first control information; and receive a data communication from the second wireless device based at least in part on the first control information and the second control information.

15. The wireless device of claim 14,
wherein the second control information is transmitted using a different control channel than the first control information.

16. The wireless device of claim 14,
wherein a first transmission of the first control information is performed using a multi-tone transmission configuration, wherein a second transmission of the first control information is performed using a single-tone transmission configuration if the first transmission of the first control information is unsuccessful,
wherein a first transmission of the second control information is performed using a multi-tone transmission configuration if the first transmission of the first control information is successful, wherein a second transmission of the second control information is performed using a single-tone transmission configuration if the first transmission of the first control information is unsuccessful.

17. The wireless device of claim 14,
wherein the second control information further comprises an indication of a transport format to use for the data communication.

18. The wireless device of claim 14,
wherein the second control information further comprises a transmit power control indication indicating a transmit power to use for the data communication.

19. The wireless device of claim 14,
wherein the second control information further comprises a burst duration indication indicating a burst duration to use for the data communication.

20. The wireless device of claim 14, wherein the wireless device is further configured to:
determine which of the wireless device or the second wireless device will transmit a subsequent data communication based at least in part on a proportional fair algorithm.

* * * * *